(12) United States Patent
Whited et al.

(10) Patent No.: US 11,345,799 B2
(45) Date of Patent: May 31, 2022

(54) FORMULATION CONTAINING A HIGH DENSITY POLYETHYLENE COMPOSITION AND MICROIRRIGATION DRIP TAPES CONTAINING THE SAME

(71) Applicant: Dow Global Technologies LLC, Midland, MI (US)

(72) Inventors: Stephanie M. Whited, Charleston, WV (US); Siddharth Ram Athreya, Freeport, TX (US); Mridula Kapur, Lake Jackson, TX (US); Alexander Stolarz, Horgen (CH); Adriana Velasquez, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 212 days.

(21) Appl. No.: 16/768,294

(22) PCT Filed: Dec. 11, 2018

(86) PCT No.: PCT/US2018/064951
§ 371 (c)(1),
(2) Date: May 29, 2020

(87) PCT Pub. No.: WO2019/118461
PCT Pub. Date: Jun. 20, 2019

(65) Prior Publication Data
US 2020/0299491 A1    Sep. 24, 2020

Related U.S. Application Data

(60) Provisional application No. 62/599,097, filed on Dec. 15, 2017.

(51) Int. Cl.
| | |
|---|---|
| *C08L 23/04* | (2006.01) |
| *C08L 23/08* | (2006.01) |
| *F16L 11/04* | (2006.01) |
| *A01G 25/02* | (2006.01) |
| *A01G 25/06* | (2006.01) |

(52) U.S. Cl.
CPC .......... *C08L 23/0815* (2013.01); *A01G 25/02* (2013.01); *A01G 25/06* (2013.01); *F16L 11/04* (2013.01); *C08L 2203/18* (2013.01); *C08L 2205/025* (2013.01); *C08L 2205/03* (2013.01); *C08L 2308/00* (2013.01); *C08L 2310/00* (2013.01)

(58) Field of Classification Search
CPC .......... C08L 23/04; C08L 23/08; F16L 11/04; A01G 25/02; A01G 25/06
USPC ........................................................ 524/528
See application file for complete search history.

(56) References Cited

U.S. PATENT DOCUMENTS

| | | | |
|---|---|---|---|
| 4,302,565 A | 11/1981 | Goeke et al. | |
| 4,482,687 A | 11/1984 | Noshay et al. | |
| 4,508,842 A | 4/1985 | Beran et al. | |
| 4,990,479 A | 2/1991 | Ishimaru et al. | |
| 5,122,494 A | 6/1992 | Job | |
| 5,290,745 A | 3/1994 | Jorgensen et al. | |
| 6,187,866 B1 | 2/2001 | Jorgensen et al. | |
| 2003/0187083 A1 | 10/2003 | Harris | |
| 2010/0003439 A1* | 1/2010 | Michie, Jr | C08L 23/26 524/400 |
| 2010/0203311 A1* | 8/2010 | Michie, Jr. | C08J 5/18 525/240 |
| 2011/0034635 A1 | 2/2011 | Kapur et al. | |
| 2012/0214954 A1 | 8/2012 | Buck et al. | |
| 2012/0215954 A1 | 8/2012 | Buck et al. | |

FOREIGN PATENT DOCUMENTS

WO    2016/065497 A1    5/2016

* cited by examiner

*Primary Examiner* — Deve V Hall
(74) *Attorney, Agent, or Firm* — Quarles & Brady LLP

(57) ABSTRACT

The present disclosure provides formulation. The formulation contains a high density polyethylene composition containing (i) a high molecular weight component including an ethylene/a-olefin copolymer, the high molecular weight component having a density from 0.924 to 0.930 g/cc and a high load melt index (121) from 0.3 to 0.9 g/10 min; and (ii) a low molecular weight component including an ethylene-based polymer selected from the group consisting of an ethylene homopolymer and an ethylene/a-olefin copolymer. The high density polyethylene composition has (a) a density from 0.950 to 0.956 g/cc; (b) a high load melt index (121) from 15 to 28 g/10 min; (c) an 121/12 of at least 85; (d) a notched constant tensile load failure time at 35% yield stress of greater than 90 hours; and (e) an environmental stress crack resistance (ESCR) F0 value, according to ASTM D1693—condition B (100% IGEPAL), of greater than 2,000 hours.

10 Claims, 1 Drawing Sheet

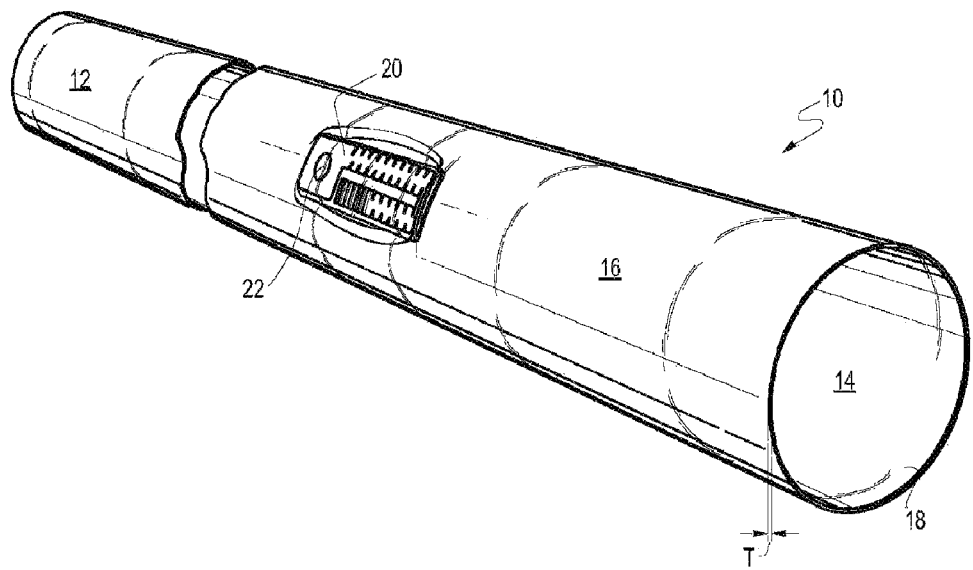

FORMULATION CONTAINING A HIGH DENSITY POLYETHYLENE COMPOSITION AND MICROIRRIGATION DRIP TAPES CONTAINING THE SAME

BACKGROUND

The present disclosure relates to formulations containing a high density polyethylene composition, and microirrigation drip tapes containing the same.

A microirrigation drip tape is a tube for transporting and dripping water, fertilizer and/or nutrition in irrigation systems. It is usually made from unimodal polyethylene with a density of 0.940 g/cc or lower. Microirrigation drip tapes formed from unimodal polyethylene with a density greater than 0.940 g/cc are difficult to produce because the polyethylene has poor processability. Polyethylene has poor processability because it lacks a suitable balance of shear and extensional viscosity that allows processors to produce microirrigation drip tapes with a wall thickness of less than 300 μm, let alone while maintaining suitable tensile strength and environmental stress crack resistance (ESCR) for irrigation systems.

The art recognizes the need for a formulation that exhibits improved processability and suitable tensile strength and environmental stress crack resistance for irrigation systems. A further need exists for a microirrigation drip tape having a thin wall that exhibits suitable tensile strength and environmental stress crack resistance for irrigation systems.

SUMMARY

The present disclosure provides formulation. The formulation includes a high density polyethylene composition containing:

(i) a high molecular weight component including an ethylene/α-olefin copolymer, the high molecular weight component having a density from 0.924 g/cc to 0.930 g/cc and a high load melt index (I21) from 0.3 g/10 min to 0.9 g/10 min, as measured according to ASTM D1238 (190° C., 21.6 kg); and (ii) a low molecular weight component including an ethylene-based polymer selected from the group consisting of an ethylene homopolymer and an ethylene/α-olefin copolymer; and the high density polyethylene composition has:

(a) a density from 0.950 g/cc to 0.956 g/cc;

(b) a high load melt index (I21) from 15 g/10 min to 28 g/10 min;

(c) an I21/I2 of at least 85, wherein I2 is the melt index as measured according to ASTM D1238 (190° C., 2.16 kg);

(d) a notched constant tensile load failure time at 35% yield stress, as measured according to ASTM D5397, of greater than 90 hours; and (e) an environmental stress crack resistance (ESCR) F0 value, according to ASTM D1693—condition B (100% IGEPAL), of greater than 2,000 hours.

The present disclosure also provides a microirrigation drip tape including the present formulation.

BRIEF DESCRIPTION OF THE DRAWINGS

FIG. 1 is a perspective view of a microirrigation drip tape in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "alkyl group" refers to an organic radical derived from an aliphatic hydrocarbon by deleting one hydrogen atom therefrom. An alkyl group may be a linear, branched, cyclic or a combination thereof. In an embodiment, the alkyl group is a $C_1$-$C_{20}$ alkyl.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

The terms, "hydrocarbyl group" and "hydrocarbon" refer to substituents containing only hydrogen and carbon atoms, including branched or unbranched, saturated or unsaturated, cyclic, polycyclic or noncyclic species. Nonlimiting examples include alkyl-, cycloalkyl-, alkenyl-, alkadienyl-, cycloalkenyl-, cycloalkadienyl-, aryl-, and alkynyl-groups.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably.

Test Methods

Burst pressure of a fabricated microirrigation drip tape in megaPascal (MPa) is measured using the Hydrostatic Quick Burst system including a Tech Team Hydrostatic Burst tank (Serial Number OR1837A), an IPT Data logger V5, an Ashcroft test gauge (0 to 600 psi) s/n c009395, and an IPT Hydrostatic Computer Stations (Model 1575.0010). 18-inch (45.72 cm) long sections of fabricated tape that do not contain an emitter are cut from a fabricated roll of tape and are connected to the Quick Burst system with fittings in a horizontal position. Pressure is ramped up using water (temperature of approximately 73° F. (23° C.)) at 2 prig/sec (14 KPa/sec) until the tape bursts with visible leakage of water from the area of rupture. The average of 5 specimens per sample is reported.

Density is measured in accordance with ASTM D792, Method B. The result is recorded in grams per cubic centimeter (g/cc).

Die Swell Ratio is measured according to the Borouge method described in International Publication No. WO 2016/065497, the entire content of which is herein incorporated by reference. The extrudate swell (die swell) is evaluated by measuring strands of extrudate cut during the melt index (I2) measurement (190° C./2.16 kg). Three 2.5 cm long strands are collected and the diameters are measured with a caliber having a readability of 0.01 mm. Die swell is expressed as a swell ratio—the ratio of the diameter of the extruder strand to the diameter of the capillary die (here, 2.096 mm). The reported die swell ratio is an average of the measured strand diameters.

Environmental stress crack resistance (ESCR) F0 and F50 in hours are measured according to ASTM D1693 using condition A or condition B, in a solution containing either 10% IGEPAL CO-630 or 100% IGEPAL CO-630. ESCR F0 is the number of hours until the first sample cracks. ESCR F50 is the number of hours until half the samples have cracked. IGEPAL CO-630 is nonylphenoxy poly(ethyleneoxy) ethanol.

Extensional Viscosity Fixture (EVF) ratio at 1 Henkey Strain is the ratio of viscosity measured at 0.1 s−1 divided by viscosity at 1 s−1, each measured at 1 Henkey strain. Transient uniaxial elongation viscosity is measured via an extensional viscosity fixture, EVF, connected to a rotational rheometer, ARES/ARESG2 by TA Instruments. A flat, rect-angular-shaped sample of approximately 0.8 mm thickness, 10 mm width, and 18 mm length is stretched at a constant extension rate between two parallel cylinders. The measured torque is used to calculate the viscosity values. Samples are pre-stretched at a constant rate of 0.005 s−1 to compensate for the thermal expansion from room temperature to test temperature. A relaxation time of 60 seconds is allowed after the pre-stretch step and before the extensional viscosity measurements. Tests are performed at three constant extension rates, 0.1 s−1, 1 s−1, and 10 s−1, at a temperature of 150° C.

High Load Melt index (MI) (I21) in g/10 min is measured using ASTM D1238 (190° C./21.6 kg).

Melt index (MI) (I2) in g/10 min is measured using ASTM D1238 (190° C./2.16 kg).

Notched constant tensile load (NCTL) failure time in hours is measured at 35% yield stress in accordance with ASTM D5397.

Shear thinning index (SHI) is calculated in accordance with the method described in International Publication No. WO 2016/065497, incorporated herein by reference, using dynamic shear measurements of the polymer melt, and is defined as the ratio of the complex viscosity ($\eta^*$) at two different shear stresses and is a measure of the broadness (or narrowness) of the molecular weight distribution. The measurements are performed on TA Instruments AR-G2 equipment equipped with a 25 mm parallel plate geometry at 190° C., a gap of 1.5 mm, and a frequency range of 0.01-500 s$^{-1}$. The SHI (2.7/210) is the ratio of the complex viscosity at 190° C. and a shear stress of 2.7 kPa ($\eta^*_{2.7\ kPa}$) and the complex viscosity at 190° C. and a shear stress of 210 kPa ($\eta^*_{210\ kPa}$).

Tensile stress at yield of the high density polyethylene composition in MPa is measured using samples prepared by compression molding pellets according to ASTM D638 (2 inch/min crosshead speed) (5.08 cm/min crosshead speed).

Tensile stress at yield of the microirrigation drip tape in MPa and tensile load at yield in Newtons (N) are measured in the machine direction (MD) on sections of fabricated microirrigation drip tape (without an emitter in the gage length) tested at 2 inch/min crosshead speed (5.08 cm/min crosshead speed). The test is performed in accordance with ASTM D638, except for aspects pertaining to sample geometry and gage length. Here, samples of at least 4 inch (10.16 cm) in length are cut from fabricated rolls of tape to allow a gage length of 1 inch (2.54 cm)

Gel Permeation Chromatography (GPC)

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four Mixed A LS 30 cm, 20 micron columns. The solvent is nitrogen-purged 1,2,4-trichlorobenzene (TCB) containing approximately 200 ppm 2,6-di-t-butyl-4-methylphenol (BHT). The flow rate is 1.0 mL/min, and the injection volume is 200 µl. A "2 mg/mL" sample concentration is prepared by dissolving the sample in $N_2$ purged and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N. Y. Hellman, & P. M. Muglia, Macromolecules, 4, 507 (1971)):

$$M_{pp} = \left(\frac{K_{PS} M_{PS}^{\alpha_{PS}+1}}{K_{pp}}\right)^{\frac{1}{\alpha_{pp}+1}}, \quad \text{(Eq 1)}$$

where $M_{pp}$ is PP equivalent MW, $M_{PS}$ is PS equivalent MW, log K and α values of Mark-Houwink coefficients for PP and PS are listed below.

| Polymer | α | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\sum_i Wf_i}{\sum_i (Wf_i / M_i)}, \quad \text{(Eq 2)}$$

$$M_w = \frac{\sum_i (Wf_i * M_i)}{\sum_i (Wf_i)}, \quad \text{(Eq 3)}$$

where $Wf_i$ and $M_i$ are the weight fraction and molecular weight of elution component i, respectively.

DETAILED DESCRIPTION

The present disclosure provides a formulation. The formulation contains a high density polyethylene composition. The high density polyethylene composition includes (i) a high molecular weight component including an ethylene/α-olefin copolymer, the high molecular weight component having a density from 0.924 g/cc to 0.930 g/cc and a high load melt index (I21) from 0.3 g/10 min to 0.9 g/10 min, as measured according to ASTM D1238 (190° C., 21.6 kg); and (ii) a low molecular weight component including an ethylene-based polymer selected from an ethylene homopolymer and an ethylene/α-olefin copolymer. The high density polyethylene composition has (a) a density from 0.950 g/cc to 0.956 g/cc; (b) a high load melt index (I21) from 15 g/10 min to 28 g/10 min; (c) an I21/I2 of at least 85, wherein I2 is the melt index as measured according to ASTM D1238 (190° C., 2.16 kg); (d) a notched constant tensile load failure time at 35% yield stress, as measured according to ASTM D5397, of greater than 90 hours; and (e) an environmental stress crack resistance (ESCR) F0 value, according to ASTM D1693—condition B (100% IGEPAL), of greater than 2,000 hours.

High Density Polyethylene Composition

The present formulation contains a high density polyethylene composition. A "high density polyethylene composition" is a polyethylene composition having a density from 0.950 g/cc to 0.956 g/cc. The high density polyethylene composition includes (i) a high molecular weight component and (ii) a low molecular weight component. The high molecular weight component has a higher molecular weight than the low molecular weight component.

The high density polyethylene composition is bimodal. A "bimodal" polyethylene composition contains two polyethylene fractions that have been produced under different polymerization conditions, including differences in any of the process conditions and/or catalyst systems, resulting in different molecular weights and/or different comonomer contents for the fractions. The first polyethylene fraction is the high molecular weight component. The second polyethylene fraction is the low molecular weight component. The bimodal high density polyethylene composition may be a mechanical blend or an in-reactor blend of the high molecular weight component and the low molecular weight component. In an embodiment, the bimodal high density polyethylene composition is an in-reactor blend of the high molecular weight component and the low molecular weight component.

The high density polyethylene composition excludes unimodal polyethylene having a single polyethylene fraction.

(i) High Molecular Weight (HMW) Component

The high density polyethylene composition includes (i) a high molecular weight (HMW) component including an ethylene/α-olefin copolymer, the high molecular weight component having a density from 0.924 g/cc to 0.930 g/cc and a high load melt index (I21) from 0.3 g/10 min to 0.9 g/10 min.

The ethylene/α-olefin copolymer of the HMW component contains ethylene and an α-olefin comonomer. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the ethylene/α-olefin copolymer does not contain an aromatic comonomer polymerized therein. In a further embodiment, the ethylene/α-olefin copolymer is an ethylene/1-hexene copolymer.

In an embodiment, the ethylene/α-olefin copolymer consists of ethylene, the $C_4$-$C_8$ α-olefin comonomer, and optional additive.

In an embodiment, the ethylene/α-olefin copolymer contains greater than 50 wt % units derived from ethylene, or from 51 wt %, or 55 wt %, or 60 wt % to 70 wt %, or 80 wt %, or 90 wt %, or 95 wt %, or 99 wt % units derived from ethylene, based on the weight of the ethylene/α-olefin copolymer. In an embodiment, the ethylene/α-olefin copolymer contains a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt % units derived from an α-olefin comonomer, based on the weight of the ethylene/α-olefin copolymer.

The high molecular weight component has a density from 0.924 g/cc, or 0.925 g/cc to 0.928 g/cc, or 0.929 g/cc, or 0.930 g/cc.

The high molecular weight component has a high load melt index (I21) from 0.3 g/10 min, or 0.4 g/10 min to 0.5 g/10 min, or 0.6 g/10 min, or 0.7 g/10 min, or 0.8 g/10 min, or 0.9 g/10 min.

In an embodiment, the high molecular weight component has a density from 0.925 g/cc to 0.928 g/cc and a high load melt index (I21) from 0.4 g/10 min to 0.6 g/10 min.

In an embodiment, the high molecular weight component includes an ethylene/$C_4$-$C_8$ α-olefin copolymer, or further an ethylene/1-hexene copolymer, and the high molecular weight component has:

(a) has a density from 0.924 g/cc, or 0.925 g/cc to 0.928 g/cc, or 0.929 g/cc, or 0.930 g/cc; and (b) a high load melt index (I21) from 0.3 g/10 min, or 0.4 g/10 min to 0.5 g/10 min, or 0.6 g/10 min, or 0.7 g/10 min, or 0.8 g/10 min, or 0.9 g/10 min.

The high molecular weight component may comprise two or more embodiments discussed herein.

(ii) Low Molecular Weight (LMW) Component

The high density polyethylene composition includes (ii) a low molecular weight (LMW) component including an ethylene-based polymer selected from an ethylene homopolymer and an ethylene/α-olefin copolymer.

In an embodiment, the low molecular weight component includes an ethylene homopolymer. The ethylene homopolymer contains 100 wt % units derived from ethylene, based on the total weight of the ethylene homopolymer. The ethylene homopolymer consists of ethylene and an optional additive.

In an embodiment, the low molecular weight component includes an ethylene/α-olefin copolymer. The ethylene/α-olefin copolymer contains ethylene and an α-olefin comonomer. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the ethylene/α-olefin copolymer does not contain an aromatic comonomer polymerized therein. In an embodiment, the ethylene/α-olefin copolymer is an ethylene/1-hexene copolymer.

In an embodiment, the ethylene/α-olefin copolymer consists of ethylene, the $C_4$-$C_8$ α-olefin comonomer, and optional additive.

In an embodiment, the ethylene/α-olefin copolymer contains greater than 50 wt % units derived from ethylene, or from 51 wt %, or 55 wt %, or 60 wt % to 70 wt %, or 80 wt %, or 90 wt %, or 95 wt %, or 99 wt %, or 100 wt % units derived from ethylene, based on the weight of the ethylene/α-olefin copolymer. In an embodiment, the ethylene/α-olefin copolymer contains a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt %, or 0 wt % units derived from an α-olefin comonomer, based on the weight of the ethylene/α-olefin copolymer.

The LMW component ethylene/α-olefin copolymer and the HMW ethylene/α-olefin copolymer differ in at least the molecular weight of the respective component. In an embodiment, the LMW component ethylene/α-olefin copolymer and the HMW ethylene/α-olefin copolymer each is an ethylene/1-hexene copolymer.

In an embodiment, the low molecular weight component has a melt index (I2) from 600 g/10 min, or 700 g/10 min, or 800 g/10 min, or 900 g/10 min, or 950 g/10 min to 970 g/10 min, or 980 g/10 min, or 990 g/10 min, or 1,000 g/10 min, or 1,200 g/10 min.

In an embodiment, the low molecular weight component has a density equal to or greater than 0.965 g/cc. In a further embodiment, the low molecular weight component has a density from 0.965 g/cc, or 0.970 g/cc, or 0.975 g/cc, or 0.978 g/cc to 0.985 g/cc. The density of the low molecular weight component may be calculated using Equation A:

$$\frac{1}{\text{Density (HDPE Comp)}} = \frac{\text{Weight Fraction }(A)}{\text{Density }(A)} + \frac{\text{Weight Fraction }(B)}{\text{Density }(B)} \quad \text{Equation A}$$

where "A" is the high molecular weight component, "B" is the low molecular weight component, and "HDPE Comp" is the high density polyethylene composition.

In an embodiment, the LMW component has a weight average molecular weight, Mw, that is less than the weight average molecular weight, Mw, of the HMW component, and the LMW component has a density that is greater than the density of the HMW component. In a further embodiment, the LMW component has a density from 0.965 g/cc, or 0.970 g/cc, or 0.975 g/cc, or 0.978 g/cc to 0.985 g/cc; and the HMW component has a density from 0.924 g/cc, or 0.925 g/cc to 0.928 g/cc, or 0.929 g/cc, or 0.930 g/cc.

In an embodiment, the LMW component has a weight average molecular weight, Mw, that is less than the weight average molecular weight, Mw, of the HMW component, and the LMW component has a high load melt index (I21) that is greater than the high load melt index (I21) of the HMW component.

In an embodiment, the low molecular weight component includes an ethylene/$C_4$-$C_8$ α-olefin copolymer, or further an ethylene/1-hexene copolymer, and the low molecular weight component has one or both of the following properties:

(a) a melt index (I2) from 600 g/10 min, or 700 g/10 min, or 800 g/10 min, or 900 g/10 min, or 950 g/10 min to 970 g/10 min, or 980 g/10 min, or 990 g/10 min, or 1,000 g/10 min, or 1,200 g/10 min; and/or (b) a density from 0.965 g/cc, or 0.970 g/cc, or 0.975 g/cc, or 0.978 g/cc to 0.985 g/cc.

The low molecular weight component may comprise two or more embodiments discussed herein.

(iii) High Density Polyethylene Composition Characteristics

The high density polyethylene composition has (a) a density from 0.950 g/cc to 0.956 g/cc; (b) a high load melt index (I21) from 15 g/10 min to 28 g/10 min; (c) an I21/I2 of at least 85; (d) a notched constant tensile load failure time at 35% yield stress of greater than 90 hours; and (e) an environmental stress crack resistance (ESCR) F0 value, according to ASTM D1693—condition B (100% IGEPAL), of greater than 2,000 hours.

The high density polyethylene composition has a density from 0.950 g/cc, or 0.951 g/cc, or 0.952 g/cc to 0.953 g/cc, or 0.954 g/cc, or 0.955 g/cc, or 0.956 g/cc. Without wishing to be bound by any particular theory, it is believed that the high density polyethylene composition with a density from 0.950 g/cc to 0.956 g/cc enables an article, such as a microirrigation drip tape, to be formed with a thinner wall without impacting the durability of the article, compared to articles formed from compositions with a density of less than 0.950 g/cc. However, microirrigation drip tape formed from a composition with a density of greater than 0.956 g/cc crystallizes too quickly after extrusion, which prevents an emitter from being placed in the microirrigation drip tape.

The high density polyethylene composition has a high load melt index (I21) from 15 g/10 min, or 17 g/10 min, or 18 g/10 min to 20 g/10 min, or 25 g/10 min, or 26 g/10 min, or 27 g/10 min, or 28 g/10 min.

The high density polyethylene composition has an I21/I2 of at least 85. In an embodiment, the high density polyethylene composition has an I21/I2 from 85, or 86, or 90, or 100, or 110, or 111 to 121, or 125, or 130, or 140, or 150.

The high density polyethylene composition has a notched constant tensile load (NCTL) failure time at 35% yield stress of greater than 90 hours. In an embodiment, the high density polyethylene composition has a NCTL failure time at 35% yield stress from 90 hours, or 95 hours, or 100 hours, or 110 hours, or 115 hours, or 120 hours to 150 hours, or 170 hours, or 180 hours, or 200 hours.

The high density polyethylene composition has an environmental stress crack resistance (ESCR) F0 value, according to ASTM D1693—condition B (100% IGEPAL), of greater than 2,000 hours. A high ESCR F0 (Condition B, 100% IGEPAL) value of greater than 2,000 hours indicates an article formed from the high density polyethylene composition, such as a microirrigation drip tape, has sufficient durability to withstand the stresses, temperature variations, scratches, and folding that the article endures exposed to the elements over time, during multiple seasons.

In an embodiment, the high density polyethylene composition has an ESCR F0 value, according to ASTM D1693—condition A (100% IGEPAL), of greater than 2,600 hours.

In an embodiment, the high density polyethylene composition has an ESCR F0 value, according to ASTM D1693—condition A (10% IGEPAL), of greater than 3,100 hours.

In an embodiment, the high density polyethylene composition has a Mw/Mn from 15, or 16, or 19 to 20, or 21, or 22, or 23.

In an embodiment, the high density polyethylene composition has a shear thinning index (SHI) (2.7/210) from 30, or 31, or 35, or 39 to 48, or 49, or 50. SHI is a measure of the broadness (or narrowness) of the molecular weight distribution of the high density polyethylene composition. SHI can also be correlated to the extent to which the diameter of the melted high density polyethylene composition exiting the die changes in dimension. Compositions having an SHI of less than 30 or greater than 50 are susceptible to break during extrusion.

In an embodiment, the high density polyethylene composition has a die swell ratio of less than 1.25. In a further embodiment, the high density polyethylene composition has a die swell ratio from 1.10, or 1.13, or 1.15 to 1.18, or 1.19, or 1.20, or 1.21, or 1.22, or 1.23, or 1.24. A die swell ratio from 1.10 to 1.24 indicates the high density polyethylene composition forms strands of substantially standard thickness.

In an embodiment, the high density polyethylene composition has a tensile stress at yield from 20 MPa, or 23 MPa, or 24 MPa to 25 MPa, or 26 MPa, or 27 MPa, or 28 MPa, or 30 MPa.

In an embodiment, the high density polyethylene composition has an Extensional Viscosity Fixture (EVF) ratio at 1 Henkey Strain from 1.50, or 1.85, or 1.90, or 1.95, or 1.97 to 2.20, or 2.26, or 2.30, or 2.35, or 2.50, or 3.00, or 3.30, or 3.50.

The sum of the weight percents of the high molecular weight component and the low molecular weight component equals 100%, based on the total weight of the high density polyethylene composition.

In an embodiment, the high density polyethylene composition contains from 45 wt %, or 49 wt %, or 50 wt % to 55 wt %, or 56 wt %, or 57 wt %, or 58 wt %, or 59 wt %, or 60 wt % of the high molecular weight component, based on the total weight of the high density polyethylene composition.

In an embodiment, the high density polyethylene composition contains from 40 wt %, or 41 wt %, or 42 wt %, or 43 wt %, or 44 wt %, or 45 wt % to 50 wt %, or 51 wt %, or 55 wt % of the low molecular weight component, based on the total weight of the high density polyethylene composition.

In an embodiment, the high density polyethylene composition contains, consists essentially of, or consists of, from 45 wt %, or 49 wt %, or 50 wt % to 55 wt %, or 56 wt %, or 57 wt %, or 58 wt %, or 59 wt %, or 60 wt % of the high molecular weight component; and a reciprocal amount of the low molecular weight component, or from 40 wt %, or 41 wt %, or 42 wt %, or 43 wt %, or 44 wt %, or 45 wt % to 50 wt %, or 51 wt %, or 55 wt % of the low molecular weight component, based on the total weight of the high density polyethylene composition. In an embodiment, the high density polyethylene composition has:

(a) a density from 0.951 g/cc, or 0.952 g/cc to 0.953 g/cc, or 0.954 g/cc;

(b) a high load melt index (I21) from 17 g/10 min, or 18 g/10 min to 20 g/10 min, or 25 g/10 min, or 26 g/10 min, or 27 g/10 min, or 28 g/10 min;

(c) an I21/I2 from 85, or 85, or 90, or 100, or 110, or 111 to 121, or 125, or 130;

(d) a NCTL failure time at 35% yield stress from 90 hours, or 95 hours, or 100 hours, or 110 hours, or 115 hours, or 120 hours to 150 hours, or 170 hours, or 180 hours; and (e) an ESCR F0 value, according to ASTM D1693—condition B (100% IGEPAL), of greater than 2,000 hours; and in addition to properties (a)-(e), the high density polyethylene composition optionally has one, some, or all of the following properties:

(f) a shear thinning index (SHI) (2.7/210) from 30, or 31, or 35, or 39 to 48, or 49, or 50; and/or (g) a die swell ratio from 1.10, or 1.13, or 1.15 to 1.18, or 1.19, or 1.20; and/or (h) a tensile stress at yield from 20 MPa, or 23 MPa, or 24 MPa to 25 MPa, or 26 MPa; and/or (i) an ESCR F0 value, according to ASTM D1693—condition A (100% IGEPAL), of greater than 2,600 hours; and/or (j) an ESCR F0 value, according to ASTM D1693—condition A (10% IGEPAL), of greater than 3,100 hours; and/or (k) a Mw/Mn from 15, or 16, or 19 to 20, or 21; and/or (l) an EVF Strain Hardening Modulus at 1 Henkey Strain from 1.50, or 1.85, or 1.90, or 1.95, or 1.97 to 2.20, or 2.26, or 2.30, or 2.35, or 2.50, or 3.00, or 3.30, or 3.50.

The high density polyethylene composition can be made by a variety of methods. For example, such methods may include, but are not limited to, gas phase polymerization process, slurry phase polymerization process, liquid phase polymerization process, and combinations thereof using one or more conventional reactors, e.g. fluidized bed gas phase reactors, loop reactors, stirred tank reactors, batch reactors in parallel, series, and/or any combinations thereof. In the alternative, the high density polyethylene composition may be produced in a high pressure reactor via a coordination catalyst system. For example, the high density polyethylene composition may be produced via gas phase polymerization process in a gas phase reactor; however, any of the above polymerization processes may be employed. In an embodiment, the polymerization reactor may comprise of two or more reactors in series, parallel, or combinations thereof, and wherein each polymerization takes place in solution, in slurry, or in the gas phase. In another embodiment, a dual reactor configuration is used where the polymer made in the first reactor can be either the high molecular weight component or the low molecular weight component. The polymer made in the second reactor may have a density and melt flow rate such that the overall density and melt flow rate of the high density polyethylene composition are met. Similar polymerization processes are described in, for example, U.S. Pat. No. 7,714,072, which is incorporated herein by reference.

In an embodiment, the method of manufacturing the high density polyethylene composition includes polymerizing a high molecular weight component, as previously described herein, in a reactor, and polymerizing a low molecular weight component, as previously described herein, in a different reactor, thereby producing a high density polyethylene composition. The two reactors may be operated in series. In some embodiments, the high molecular weight component is polymerized in a first reactor, and the low molecular weight component is polymerized in a second reactor. In other embodiments, the low molecular weight component is polymerized in a first reactor, and the high molecular weight component is polymerized in a second reactor.

In an embodiment, the weight ratio of copolymer prepared in the high molecular weight reactor to copolymer prepared in the low molecular weight reactor is in the range of from 30:70 to 70:30, or in the range of from 40:60 to 60:40. This is also known as the polymer split.

In an embodiment, the high density polyethylene composition is manufactured using at least one Ziegler-Natta (Z-N) catalyst system. In other embodiments, the high density polyethylene composition is manufactured using multiple reactors in series with a Z-N catalyst being fed to either each reactor or to just the first reactor. In further embodiments, the Z-N catalyst system may be fed into one or two independently-controlled reactors configured sequentially, and operated in solution, slurry or gas phase. In even further embodiments, the Z-N catalyst system may be fed into one or two independently-controlled reactors configured sequentially, and operated in gas phase. Sequential polymerization may be conducted such that fresh catalyst is injected into one reactor, and active catalyst is carried over from the first reactor into the second reactor. The resulting high density polyethylene composition may be characterized as comprising component polymers, each having distinct, unimodal molecular weight distributions. As used herein, "distinct," when used in reference to the molecular weight distribution of the high molecular weight component and the low molecular weight component indicates there are two corresponding molecular weight distributions in the resulting GPC curve of the high density polyethylene composition. As used herein, "unimodal," when used in reference to the molecular weight distribution of a component polymer of the high density polyethylene composition indicates that the molecular weight distribution in a GPC curve of the component polymer does not exhibit multiple molecular weight distributions.

The term "procatalyst" or "precursor", are used interchangeably herein, and denote a compound including a ligand, a transition metal, and optionally, an electron donor. The procatalyst may further undergo halogenation by contacting with one or more halogenating agents. A procatalyst can be converted into a catalyst upon activation. Such catalysts are commonly referred to as Ziegler-Natta catalysts. Suitable Zeigler-Natta catalysts are known in the art and include, for example, the catalysts taught in U.S. Pat. Nos. 4,302,565; 4,482,687; 4,508,842; 4,990,479; 5,122,494; 5,290,745; and, 6,187,866 B1, the disclosures of which are hereby incorporated by reference. The collection of catalyst components, such as procatalyst(s), cocatalyst(s), is referred to as a catalyst system.

The transition metal compound of the procatalyst composition can include compounds of different kinds. The most usual are titanium compounds—organic or inorganic—having an oxidation degree of 3 or 4. Other transition metals such as, vanadium, zirconium, hafnium, chromium, molybdenum, cobalt, nickel, tungsten and many rare earth metals are also suitable for use in Ziegler-Natta catalysts. The transition metal compound is usually a halide or oxyhalide, an organic metal halide or purely a metal organic compound. In the last-mentioned compounds, there are only organic ligands attached to the transition metal.

In an embodiment, the procatalyst has the formula $Mg_d Me(OR)_e X_f (ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >1 to 1.5(d). Me is a transition metal selected from the group of titanium, zirconium, hafnium and vanadium. Some specific examples of suitable titanium compounds are: $TiCl_3$, $TiCl_4$, $Ti(OC_2H_5)_2Br_2$, $Ti(OC_6H_5) Cl_3$, $Ti(OCOCH_3)Cl_3$, $Ti(acetylacetonate)_2Cl_2$, $TiCl_3(acetylacetonate)$, and $TiBr_4$.

The magnesium compounds include magnesium halides such as $MgCl_2$ (including anhydrous $MgCl_2$), $MgBr_2$, and $MgI_2$. Nonlimiting examples of other suitable compounds are $Mg(OR)_2$, $Mg(OCO_2Et)$ and MgRCl where R is defined above. From 0.5 to 56 moles, or from 1 to 20 moles of the magnesium compounds are used per mole of transition metal compound. Mixtures of these compounds may also be used.

The procatalyst compound can be recovered as a solid using techniques known in the art, such as precipitation of the procatalyst or by spray drying, with or without fillers. Spray drying is a particularly preferred method for recovery of the procatalyst compound. Spray drying is taught in U.S. Pat. No. 5,290,745 and is hereby incorporated by reference. A further procatalyst including magnesium halide or alkoxide, a transition metal halide, alkoxide or mixed ligand transition metal compound, an electron donor and optionally, a filler can be prepared by spray drying a solution of said compounds from an electron donor solvent.

The electron donor is typically an organic Lewis base, liquid at temperatures in the range of from 0° C. to 200° C., in which the magnesium and transition metal compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl mono-ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. Mono-ether is defined herein as a compound that contains only one ether functional group in the molecule. For ethylene homo and co-polymerization, the most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While an excess of electron donor may be used initially to provide the reaction product of transition metal compound and electron donor, the reaction product finally contains from 1 to 20 moles of electron donor per mole of transition metal compound, or from 1 to 10 moles of electron donor per mole of transition metal compound. The ligands include halogen, alkoxide, aryloxide, acetylacetonate, and amide anions.

Partial activation of the procatalyst can be carried out prior to the introduction of the procatalyst into the reactor. The partially activated catalyst alone can function as a polymerization catalyst but at greatly reduced and commercially unsuitable catalyst productivity. Complete activation by additional cocatalyst is required to achieve full activity. The complete activation occurs in the polymerization reactor via addition of cocatalyst.

The catalyst procatalyst can be used as dry powder or slurry in an inert liquid. The inert liquid is typically a mineral oil. The slurry prepared from the catalyst and the inert liquid has a viscosity measured at 1 sec$^{-1}$ of at least 500 cp (500 mPa·s) at 20° C. Nonlimiting examples of suitable mineral oils are the Kaydol™ and Hydrobrite™ mineral oils from Crompton.

In an embodiment of the polymerization process, the procatalyst undergoes in-line reduction using reducing agent(s). The procatalyst is introduced into a slurry feed tank; the slurry then passes via a pump to a first reaction zone immediately downstream of a reagent injection port where the slurry is mixed with the first reagent, as described below. Optionally, the mixture then passes to a second reaction zone immediately downstream of a second reagent injection port where it is mixed with the second reagent (as described below) in a second reaction zone. While only two reagent injection and reaction zones are described above, additional reagent injection zones and reaction zones may be included, depending on the number of steps required to fully activate and modify the catalyst to allow control of the specified fractions of the polymer molecular weight distribution. Methods to control the temperature of the catalyst procatalyst feed tank and the individual mixing and reaction zones are provided.

Depending on the activator compound used, some reaction time may be required for the reaction of the activator compound with the catalyst procatalyst. This is conveniently done using a residence time zone, which can consist either of an additional length of slurry feed pipe or an essentially plug flow holding vessel. A residence time zone can be used for both activator compounds, for only one or for neither, depending entirely on the rate of reaction between activator compound and catalyst procatalyst.

Exemplary in-line reducing agents are aluminum alkyls and aluminum alkyl chlorides of the formula $AlR_xCl_y$ where $X+Y=3$ and y is 0 to 2 and R is a C1 to C14 alkyl or aryl radical. Nonlimiting examples of in-line reducing agents include diethylaluminum chloride, ethylaluminum dichloride, diisobutylaluminum chloride, dimethylaluminum chloride, methylaluminum sesquichloride, ethylaluminum sesquichloride, triethylaluminum, trimethylaluminum, triisobutylaluminum, tri-n-hexylaluminum, tri-n-octylaluminum, and dimethylaluminum chloride.

The entire mixture is then introduced into the reactor where the activation is completed by the cocatalyst. Additional reactors may be sequenced with the first reactor, however, catalyst is typically only injected into the first of these linked, sequenced reactors with active catalyst transferred from a first reactor into subsequent reactors as part of the polymer thus produced.

The cocatalysts, which are reducing agents, conventionally used are comprised of aluminum compounds, but compounds of lithium, sodium and potassium, alkaline earth metals as well as compounds of other earth metals than aluminum are possible. The compounds are usually hydrides, organometal or halide compounds. Conventionally, the cocatalysts are selected from the group comprising Al-trialkyls, Al-alkyl halides, Al-alkyl alkoxides and Al-alkyl alkoxy halides. In particular, Al-alkyls and Al-alkyl chlorides are used. These compounds are exemplified by trimethylaluminum, triethylaluminum, tri-isobutylaluminum, tri-n-hexylaluminum, dimethylaluminum chloride, diethylaluminum chloride, ethylaluminum dichloride and diisobutylaluminum chloride, isobutylaluminum dichloride and the like. Butyllithium and dibutylmagnesium are examples of useful compounds of other metals.

The high density polyethylene composition may comprise two or more embodiments discussed herein.

(iv) Formulation

The present formulation contains the high density polyethylene composition and an optional additive.

Nonlimiting examples of suitable additives include carbon black, nucleating agents, antioxidants, antiozoants, lubricants, stabilizers, processing aids, filler, colorants, curatives, and combinations thereof.

In an embodiment, the formulation contains a filler. Nonlimiting examples of suitable filler include water-proofing filler and inorganic filler. In an embodiment, the filler is carbon black. The carbon black may be included as a carbon black masterbatch. A nonlimiting example of a suitable carbon black masterbatch is Kritilen™ black A354 Masterbatch from Plastika Kritis S. A. (which also contains a processing aid). In a further embodiment, the formulation contains from 0.5 wt %, or 1 wt % to 2 wt %, or 3 wt %, or 3.5 wt %, or 5 wt % carbon black, based on the total weight of the formulation. In an embodiment, the formulation contains a filler such as carbon black, and a processing aid.

In an embodiment, the formulation contains a nucleating agent. A nonlimiting example of a suitable nucleating agent is HYPERFORM™ HPN 210 M, available from Milliken Chemical. In an embodiment, the nucleating agent orients the crystals in the machine direction, which increases the tensile strength at yield.

The additive may comprise two or more embodiments discussed herein.

In an embodiment, the formulation contains at least 90 wt % of the high density polyethylene composition, based on the total weight of the formulation. In another embodiment, the formulation contains from 90 wt %, or 91 wt %, or 92 wt %, or 93 wt %, or 94 wt %, or 95 wt % to 96 wt %, or 97 wt %, or 98 wt %, or 99 wt %, or 99.5 wt %, or 100 wt % of the high density polyethylene composition, based on the total weight of the formulation.

In an embodiment, the formulation consists essentially of, or consists of, the high density polyethylene composition.

The formulation may comprise two or more embodiments discussed herein.

The present disclosure provides a microirrigation drip tape containing the present formulation.

Microirrigation Drip Tape

The present disclosure provides a microirrigation drip tape.

A "microirrigation drip tape" is an extruded structure having an annular wall composed of the present formulation, the annular wall defining an annular passageway. In other words, the microirrigation drip tape is a tube through which water, or another liquid, may pass. FIG. 1 depicts a microirrigation drip tape 10 having an annular wall 12 that defines an annular passageway 14. The annular wall 12 has an exterior surface 16 and an interior surface 18. In an embodiment, the annular wall 12 of the microirrigation drip tape 10 is composed solely of the present formulation.

Emitters 20 are arranged at intervals along the interior surface 18 of the annular wall 12. An "emitter" is an insert that controls the rate at which water or another liquid passes through an opening 22 (e.g., a hole, a slit, or a perforation) made in the annular wall by mechanical drilling, cutting or laser cutting. The emitter 20 is placed on the interior surface 18 of the annular wall 12 after the microirrigation drip tape 10 exits the extruder while the formulation is in transition from the molten state to the rigid state, which enables the emitter 20 to adhere to the microirrigation drip tape 10 via welding. The adherence of the emitter 20 to the annular wall 12 is sufficient to keep the emitter 20 in a fixed position, and to maintain a leak-proof seal between the annular wall 12 and the emitter 20.

The microirrigation drip tape has a cross-sectional shape. Nonlimiting examples of suitable cross-sectional shapes for the microirrigation drip tape include ellipse, polygon, and combinations thereof. A "polygon" is a closed-plane figure bounded by at least three sides. The polygon can be a regular polygon, or an irregular polygon having three, four, five, six, seven, eight, nine, ten or more sides. Nonlimiting examples of suitable polygonal shapes include triangle, square, rectangle, diamond, trapezoid, parallelogram, hexagon and octagon. An "ellipse" is a plane curve such that the sum of the distances of each point in its periphery from two fixed points, the foci, are equal. The ellipse has a center which is the midpoint of the line segment linking the two foci. The ellipse has a major axis (the longest diameter through the center). The minor axis is the shortest line through the center. The ellipse center is the intersection of the major axis and the minor axis. A "circle" is a specific form of ellipse, where the two focal points are in the same place (at the circle's center). Nonlimiting examples of ellipse shapes include circle, oval, and ovoid. FIG. 1 depicts a microirrigation drip tape 10 having a circle cross-sectional shape.

In an embodiment, the annular wall 12 has a thickness, T, from 100.0 μm (3.9 mil), or 101.6 μm (4 mil), or 127.0 μm (5 mil), or 152.4 μm (6 mil) to 165.1 μm (6.5 mil), or 177.8 μm (7 mil), or 203.2 μm (8 mil), or 228.6 μm (9 mil), or 254.0 μm (10 mil), or 508.0 μm (20 mil), or 762.0 μm (30 mil), or 1016 μm (40 mil), or 1270 μm (50 mil), or 2540 μm (100 mil). The annular wall having a thickness, T, from 100 μm to 2540 μm advantageously requires a lower amount of the present formulation to be used relative to microirrigation tapes having an annular wall with a thickness greater than 2540 μm.

In an embodiment, the microirrigation drip tape has a burst pressure greater than 0.31 MPa, as measured on a microirrigation drip tape having an annular wall thickness of 6 mil (152.4 μm). In another embodiment, the microirrigation drip tape has a burst pressure from 0.31 MPa, or 0.32 MPa, or 0.33 MPa to 0.34 MPa, or 0.35 MPa, or 0.38 MPa, or 0.40 MPa, or 0.50 MPa, measured on a microirrigation drip tape having an annular wall thickness of 6 mil (152.4 μm).

In an embodiment, the microirrigation drip tape has an internal diameter from 10 mm, or 11 mm, or 12 mm, or 13 mm, or 14 mm, or 15 mm, or 16 mm to 17 mm, or 18 mm, or 19 mm, or 20 mm, or 25 mm.

In an embodiment, the tensile stress at yield of the microirrigation drip tape is from 19 MPa, or 20 MPa to 22 MPa, or 23 MPa, or 25 MPa, or 30 MPa.

In an embodiment, the microirrigation drip tape has one, some, or all of the following properties:

(a) an annular wall thickness from 100.0 μm (3.9 mil), or 101.6 μm (4 mil), or 127.0 μm (5 mil), or 152.4 μm (6 mil) to 165.1 μm (6.5 mil), or 177.8 μm (7 mil), or 203.2 μm (8 mil), or 228.6 μm (9 mil), or 254.0 μm (10 mil), or 508.0 μm (20 mil), or 762.0 μm (30 mil), or 1016 μm (40 mil), or 1270 μm (50 mil), or 2540 μm (100 mil); and/or (b) an internal diameter from 10 mm, or 11 mm, or 12 mm, or 13 mm, or 14 mm, or 15 mm, or 16 mm to 17 mm, or 18 mm, or 19 mm, or 20 mm, or 25 mm; and/or (c) a burst pressure from 0.31 MPa, or 0.32 MPa, or 0.33 MPa, or 0.34 MPa to 0.35 MPa, or 0.38 MPa, or 0.40 MPa, or 0.50 MPa, measured on a microirrigation drip tape having an annular wall thickness of 6 mil (152.4 μm); and/or (d) a tensile stress at yield from 19 MPa, or 20 MPa to 22 MPa, or 23 MPa, or 25 MPa, or 30 MPa, measured on a microirrigation drip tape having an annular wall thickness of 6 mil (152.4 μm); and/or (e) a tensile load at yield from 160 N, or 165 N, or 167 N to 225 N, or 230 N, or 250 N, or 260 N, measured on a microirrigation drip tape having an annular wall thickness of 6 mil (152.4 μm).

In an embodiment, the microirrigation drip tape has one, some, or all of the following properties:

(a) an annular wall thickness from 100.0 μm (3.9 mil), or 101.6 μm (4 mil), or 127.0 μm (5 mil), or 152.4 μm (6 mil) to 165.1 μm (6.5 mil), or 177.8 μm (7 mil), or 203.2 μm (8 mil), or 228.6 μm (9 mil), or 254.0 μm (10 mil), or 508.0 μm (20 mil), or 762.0 μm (30 mil), or 1016 μm (40 mil), or 1270 μm (50 mil), or 2540 μm (100 mil); and/or (b) an internal diameter from 10 mm, or 11 mm, or 12 mm, or 13 mm, or 14 mm, or 15 mm, or 16 mm to 17 mm, or 18 mm, or 19 mm, or 20 mm, or 25 mm; and/or (c) a burst pressure from 0.31 MPa, or 0.32 MPa, or 0.33 MPa, or 0.34 MPa to 0.35 MPa, or 0.38 MPa, or 0.40 MPa, or 0.50 MPa, measured on a microirrigation drip tape having an annular wall thickness of 8 mil (203.2 μm); and/or (d) a tensile stress at yield from 19 MPa, or 20 MPa to 22 MPa, or 23 MPa, or 25 MPa, or 30 MPa, measured on a microirrigation drip tape having an annular wall thickness of 8 mil (203.2 μm); and/or (e) a tensile load at yield from 160 N, or 165 N, or 167 N to 225 N, or 230 N, or 250 N, or 260 N, measured on a microirrigation drip tape having an annular wall thickness of 8 mil (203.2 μm).

The present microirrigation drip tape is suitable for agricultural drip irrigation systems, including those used in farming, public gardens, private gardens, and golf courses.

The microirrigation drip tape may comprise two or more embodiments discussed herein By way of example, and not limitation, some embodiments of the present disclosure will now be described in detail in the following Examples.

EXAMPLES

Materials used in the examples are provided in Table 1A below.

TABLE 1A

Materials

| Material/Description | Properties | Source |
| --- | --- | --- |
| FINGERPRINT ™ DFDC-7525 NT (DFDC-7525) | ethylene/1-hexene copolymer medium density polyethylene (MDPE) | The Dow Chemical Company |
| UNIVAL ™ DMDC-6143 NT 7 (DMDC-6143) | ethylene/1-hexene copolymer high density polyethylene (HDPE) | The Dow Chemical Company |
| CONTINUUM ™ DGDA-2420 NT (DGDA-2420) | ethylene/1-hexene copolymer | The Dow Chemical Company |
| CONTINUUM ™ DMDD-6620 HEALTH + (DMDD-6620) | ethylene/hexene copolymer | The Dow Chemical Company |
| Kritilen ™ Black A354 Masterbatch (Carbon Black A354) | Masterbatch containing 50 wt % carbon black and a processing aid in a polyethylene carrier resin, based on the total weight of the masterbatch | Plastika Kritis S.A. |

Preparation of CS 4, Ex 5, Ex 6, Ex 7, and Ex 8

Sample polyethylene compositions CS 4, Ex 5, Ex 6, Ex 7, and Ex 8 are ethylene-based resins produced using a catalyst system including a procatalyst, UCAT™ J (commercially available from Univation Technologies, LLC, Houston, Tex.), and a cocatalyst, triethylaluminum (TEAL), in a gas phase polymerization process. The UCAT™ J catalyst is partially activated by contact at room temperature with an appropriate amount of a 50 percent mineral oil solution of tri-n-hexyl aluminum (TNHA). The catalyst slurry is added to a mixing vessel. While stirring, a 50 percent mineral oil solution of tri-n-hexyl aluminum (TNHA) is added at ratio of 0.17 moles of TNHA to mole of residual THF in the catalyst and stirred for at least 1 hour prior to use. Ethylene (C2) and optionally, 1-hexene (C6) are polymerized in two fluidized bed reactors. Each polymerization is continuously conducted, after equilibrium is reached, under the respective conditions, as shown below in Table 1B. Polymerization is initiated in the first reactor by continuously feeding the catalyst and cocatalyst (trialkyl aluminum, specifically tri ethyl aluminum or TEAL) into a fluidized bed of polyethylene granules, together with ethylene, hydrogen, and, optionally, 1-hexene. The resulting polymer, mixed with active catalyst, is withdrawn from the first reactor, and transferred to the second reactor, using second reactor gas as a transfer medium. The second reactor also contains a fluidized bed of polyethylene granules. Ethylene and hydrogen are introduced into the second reactor, where the gases come into contact with the polymer and catalyst from the first reactor. Inert gases, nitrogen and isopentane, make up the remaining pressure in both the first and second reactors. In the second reactor, the cocatalyst (TEAL) is again introduced. The final product blend is continuously removed. Table 1B lists the polymerization conditions for CS 4, Ex 5, Ex 6, Ex 7, and Ex 8.

The product is combined with additives (500 ppm calcium stearate, 1300 ppm Irganox™ 1010, and 1300 ppm Irgafos™ 168) and fed to a continuous mixer (Kobe Steel, Ltd. LCM-100 continuous mixer), which is closed coupled to a gear pump, and equipped with a melt filtration device and an underwater pelletizing system.

TABLE 1B

| | CS 4 | | Ex 5 | | Ex 6 | | Ex 7 | | Ex 8 | |
| --- | --- | --- | --- | --- | --- | --- | --- | --- | --- | --- |
| Reactor | 1 | 2 | 1 | 2 | 1 | 2 | 1 | 2 | 1 | 2 |
| Catalyst | UCAT ™ J | | UCAT ™ J | | UCAT ™ J | | UCAT ™ J | | UCAT ™ J | |
| Temperature (° C.) | 85 | 110 | 85 | 110 | 85 | 110 | 85 | 110 | 85 | 110 |
| Pressure (psig) | 348 | 398 | 348 | 398 | 348 | 399 | 348 | 399 | 348 | 398 |
| Pressure (MPa) | 2.40 | 2.74 | 2.40 | 2.74 | 2.40 | 2.75 | 2.40 | 2.75 | 2.40 | 2.74 |
| $C_2$ Partial Pressure | 38 | 98 | 36 | 102 | 34 | 105 | 31 | 107 | 31 | 100 |

TABLE 1B-continued

|  | CS 4 | | Ex 5 | | Ex 6 | | Ex 7 | | Ex 8 | |
| --- | --- | --- | --- | --- | --- | --- | --- | --- | --- | --- |
| Reactor | 1 | 2 | 1 | 2 | 1 | 2 | 1 | 2 | 1 | 2 |
| Catalyst | UCAT ™ J | | UCAT ™ J | | UCAT ™ J | | UCAT ™ J | | UCAT ™ J | |
| $C_2$ Partial Pressure (MPa) | 0.26 | 0.68 | 0.25 | 0.70 | 0.23 | 0.72 | 0.21 | 0.74 | 0.21 | 0.69 |
| $H_2/C_2$ Molar Ratio | 0.047 | 1.8 | 0.045 | 1.8 | 0.026 | 1.8 | 0.023 | 1.8 | 0.020 | 1.8 |
| $C_6/C_2$ Molar Ratio | 0.0449 | 0.0003 | 0.0670 | 0.0004 | 0.0582 | 0.0003 | 0.0718 | 0.0004 | 0.0620 | 0.0003 |
| IC5% | 11.92 | 5.13 | 11.83 | 5.11 | 11.92 | 5.08 | 11.92 | 5.06 | 11.92 | 5.05 |
| Cat Feed Rate (cc/hr) | 4.37 | — | 4.70 | — | 5.30 | — | 5.90 | — | 5.90 | — |
| Cocatalyst | 2.5% TEAL | 2.5% TEAL | 2.5% TEAL | 2.5% TEAL | 2.5% TEAL | 2.5% TEAL | 2.5% TEAL | 2.5% TEAL | 2.5% TEAL | 2.5% TEAL |
| Cocat. Feed Rate (cc/hr) | 247 | 200 | 264 | 199 | 278 | 200 | 294 | 200 | 295 | 199 |
| Production Rate | 34.2 | 25.5 | 34.8 | 28.0 | 37.1 | 29.5 | 35.3 | 36.1 | 31.6 | 32.7 |
| Bed Weight (lbs) | 100 | 168 | 101 | 164 | 101 | 163 | 101 | 163 | 100 | 163 |
| Bed Weight (kg) | 45.4 | 76.2 | 45.8 | 74.4 | 45.8 | 73.9 | 45.8 | 73.9 | 45.4 | 73.9 |
| Split (%) | 57.3 | 42.7 | 55.5 | 44.5 | 55.7 | 44.3 | 49.5 | 50.5 | 50.4 | 49.6 |

Sample polyethylene compositions and their properties are provided below in Table 2. In Table 2, "CS" refers to comparative samples; "HMW" refers to the high molecular weight component; and "LMW" refers to the low molecular weight component.

TABLE 2

Polyethylene Compositions

|  | CS 1 (DFDC-7525) | CS 2 (DMDC-6143) | CS 3 (DGDA-2420) | CS 4 | Ex 5 | Ex 6 | Ex 7 | Ex 8 | CS 9 (DMDD-6620) |
| --- | --- | --- | --- | --- | --- | --- | --- | --- | --- |
| Unimodal or Bimodal[3] | Unimodal | Unimodal | Bimodal | Bimodal | Bimodal | Bimodal | Bimodal | Bimodal | Bimodal |
| Comonomer[3] | Hexene | Hexene | Hexene | Hexene | Hexene | Hexene | Hexene | Hexene | Hexene |
| HMW |  |  |  |  |  |  |  |  |  |
| Density (g/cc) | N/A | N/A | — | 0.9314 | 0.9295 | 0.9278 | 0.9257 | 0.9267 | — |
| I21 (g/10 min) |  |  |  | 0.9 | 0.9 | 0.5 | 0.5 | 0.4 |  |
| Mw (g/mol) |  |  |  | 235,603 | 236,125 | 244,068 | 228,092 | 249,381 |  |
| LMW | N/A | N/A | — | 0.9817 | 0.9816 | 0.9845 | 0.9786 | 0.9781 | — |
| Density (g/cc)[5] |  |  |  |  |  |  |  |  |  |
| Density (g/cc)[3] | 0.9395 | 0.952 | 0.940 | 0.9524 | 0.9520 | 0.9521 | 0.9517 | 0.9515 | 0.958 |
| I21 (g/10 min)[3] | 22 | 14 | 9.5 | 18.0 | 24.2 | 18.1 | 25.4 | 17.7 | 27 |
| I21/I2[3] | 110 | 100 | 60 | 77 | 86 | 111 | 125 | 121 | 90 |
| NCTL Failure Time @ 35% Yield Stress (hrs)[1,3] | 356 ± 6.6 | NM | NM | 107.90 ± 14.75 | 103.94 ± 15.27 | 161.32 ± 27.38 | 122.4 ± 9.31 | 150.95 ± 32.36 | NM |
| ESCR F0 Condition A 10% IGEPAL (hrs)[3] | NM | NM | NM | NM | >3100 | >3100 | >3100 | >3100 | NM |
| ESCR F0 Condition A 100% IGEPAL (hrs)[3] | NM | NM | NM | NM | >2600 | >2600 | >2600 | >2600 | NM |
| ESCR F0 Condition B 10% IGEPAL (hrs)[3] | NM | NM | NM | NM | NM | NM | NM | NM | 300 |
| ESCR F0 Condition B 100% IGEPAL (hrs)[3] | >2000 | 1100 | >2000 | >2000 | >2000 | >2000 | >2000 | >2000 | >2000[4] |

TABLE 2-continued

Polyethylene Compositions

| | CS 1 (DFDC-7525) | CS 2 (DMDC-6143) | CS 3 (DGDA-2420) | CS 4 | Ex 5 | Ex 6 | Ex 7 | Ex 8 | CS 9 (DMDD-6620) |
|---|---|---|---|---|---|---|---|---|---|
| Mw/Mn[3] | 23.09 | 20.73 | 9.005 | 17.65 | 16.02 | 19.65 | 20.05 | 20.86 | 17.02 |
| wt % HMW[3] | N/A | N/A | — | 57.3 | 55.5 | 55.7 | 49.5 | 50.4 | — |
| Shear Thinning Index (2.7/210) @ 190° C.[3] | 67.92 | 78.63 | 15.93 | 26.67 | 31.30 | 39.81 | 47.61 | 48.00 | 34.85 |
| Die Swell Ratio[3] | 1.44 ± 0.01 | NM | 1.19 ± 0.02 | 1.18 ± 0.02 | 1.18 ± 0.01 | 1.17 ± 0.01 | 1.16 ± 0.02 | 1.16 ± 0.01 | 1.21 ± 0.02 |
| Tensile Stress at Yield (MPa)[3] | 19.31 | 24.82 | 19.99 | 24.82 | 24.82 | 24.82 | 24.82 | 24.82 | 24.82 |
| EVF ratio at 1 Henky Strain[2,3] | 3.35 | NM | NM | 3.28 | 2.05 | 1.97 | 2.26 | 2.04 | 2.13 |

NM = not measured
[1]Notched constant tensile load (NCTL) failure load time at 35% yield stress
[2]Extensional Viscosity Fixture (EVF) ratio at 1 Henkey Strain (Eta_0.1s-1/Eta_1.0s-1)
[3]Property of the entire polyethylene composition
[4]Estimated value based on reported F50 of 1000-2100 hours.
[5]LMW Density is calculated using Equation A.

$$\frac{1}{Density\ (HDPE\ Comp)} = \frac{Weight\ Fraction\ (A)}{Density\ (A)} + \frac{Weight\ Fraction\ (B)}{Density\ (B)} \quad Equation\ A$$

CS 1 is a comparative composition because it is a unimodal composition. Moreover, CS 1 exhibits a density less than 0.950 g/cc (CS 1's density is 0.9395 g/cc). Furthermore, CS 1 exhibits (i) a SHI of greater than 50 (67.92), indicating CS 1 is susceptible to break during extrusion; (ii) a die swell ratio of greater than 1.24 (1.44), indicating CS 1 forms strands of irregular thickness; and (iii) a tensile stress at yield of less than 20 MPa (19.31).

CS 2 is a comparative composition because it is a unimodal composition. Moreover, CS 2 exhibits a high load melt index (I21) of less than 15 g/10 min (CS 2's I21 is 14 g/10 min) and an ESCR F0 value, condition B (100% IGEPAL), of less than 2,000 hours, indicating a tape formed from CS 2 would not have sufficient durability to withstand the stresses, temperature variations, scratches, and folding that tape endures exposed to the elements over time, during multiple seasons. Furthermore, CS 2 exhibits a SHI of greater than 50 (78.63), indicating CS 2 is susceptible to break during extrusion.

CS 3 is a comparative composition because CS 3 exhibits (i) a density less than 0.950 g/cc (C3's density is 0.940 g/cc); (ii) a high load melt index (I21) of less than 15 g/10 min (CS 3's I21 is 9.5 g/10 min); and (iii) an I21/I2 of less than 85 (CS 3's I21/I2 is 60). Furthermore, CS 3 exhibits (i) a SHI of less than 30 (15.93), indicating CS 3 is susceptible to break during extrusion; and (ii) a tensile stress at yield of less than 20 MPa (19.99).

CS 4 is a comparative composition because (i) the density of CS 4's high molecular weight component is greater than 0.930 g/cc (CS 4's HMW component density is 0.9317 g/cc) and (ii) CS 4 exhibits an I21/I2 of less than 85 (CS 4's I21/I2 is 77). Furthermore, CS 4 exhibits a SHI of less than 30 (26.67), indicating CS 4 is susceptible to break during extrusion.

CS 9 is a comparative composition because CS 9 exhibits (i) a density greater than 0.956 g/cc (CS 9's density is 0.958 g/cc) and (ii) an ESCR F0 value, condition B (100% IGEPAL), of less than 2,000 hours, indicating a tape formed from CS 2 would not have sufficient durability to withstand the stresses, temperature variations, scratches, and folding that tape endures exposed to the elements over time, during multiple seasons.

High density polyethylene compositions Ex 5, Ex 6, Ex 7, and Ex 8 are suitable for processing into microirrigation drip tapes because each exhibits the ideal combination of molecular weight distribution (which imparts a superior balance of physical properties such as tensile strength and ESCR), melt flow, melt strength, and melt stretchability necessary for high speed extrusion and fabrication of microirrigation drip tapes.

Microirrigation drip tapes A-O having the structure of microirrigation drip tape 10 as shown in FIG. 1 are formed from the formulations of Table 2 using a Maillefer™ Extruder MXC 60-36D with a diameter of 60 mm and a length/diameter (L/D) ratio of 36. The extruder uses a suitable temperature profile to achieve a melt temperature of 240° C. The extruder is equipped with an annular die having a 34.5 mm diameter and a pin having a 32.5 mm diameter (gap of 1 mm). Each microirrigation drip tape A-O has an internal diameter of 16 mm. Thickness of the annular wall 12 is adjusted by changing the rotations per minute (rpm) of the extruder, and the line speed of the extruder. Then, each microirrigation drip tape A-O is calibrated and water cooled. During cooling of the tape, just after exiting the extruder, emitters (with shape/structure of emitter 20 in FIG. 1) are placed on the interior surface of the annular wall. Down the line, perforations in the annular wall at the emitters are made online before winding the tape by a mechanical drilling device or laser cut.

The extrusion speed and the annular wall thickness for each microirrigation drip tape is provided in Table 3.

The microirrigation drip tapes are tested for burst pressure. The results are reported in Table 3.

TABLE 3

| | Polyethylene Composition (wt %) | Carbon Black A354 Master batch (wt %) | Extrusion Speed (m/min) | Wall Thickness (mil) | Burst Pressure (MPa) | Tensile Stress at Yield of Fabricated Tapes (MPa) | Tensile Load at Yield (N) |
|---|---|---|---|---|---|---|---|
| Tape A | CS 1 (100 wt %) | — | 200 | 6 | NM | 17.9 | 137.2 |
| Tape B | CS 1 (100 wt %) | — | 200 | 8 | 0.35 | 16.6 | 170.4 |
| Tape C* | CS 4 (100 wt %) | — | 200 | — | — | — | — |
| Tape D | Ex 5 (100 wt %) | — | 200 | 8 | NM | NM | NM |
| Tape E | Ex 6 (100 wt %) | — | 200 | 6 | NM | 22.4 | 172.1 |
| Tape G | Ex 6 (100 wt %) | — | 200 | 8 | NM | 21.5 | 220.5 |
| Tape H | Ex 7 (100 wt %) | — | 200 | 6 | 0.38 | 22.1 | 169.8 |
| Tape I | Ex 7 (100 wt %) | — | 200 | 8 | 0.46 | 19.6 | 201.2 |
| Tape J | Ex 7 (100 wt %) | — | 250 | 6 | NM | 21.9 | 167.9 |
| Tape K | Ex 8 (100 wt %) | — | 200 | 6 | 0.34 | 22.9 | 175.9 |
| Tape L | Ex 8 (100 wt %) | — | 200 | 8 | 0.46 | 20.2 | 207.6 |
| Tape M | Ex 8 (100 wt %) | — | 250 | 6 | NM | 22.7 | 174.2 |
| Tape N | CS 1 (96.5 wt %) | 3.5 wt % | 250 | 6 | NM | 20.5 | 157.6 |
| Tape O | Ex 7 (96.5 wt %) | 3.5 wt % | 250 | 6 | NM | 22.2 | 170.4 |

*Tape C containing CS 4 could not be processed due to insufficient melt strechability that caused the tape to break at the calibration.
NM = not measured Tape A, Tape B, and Tape N each contain CS 1. Tape A and Tape N are not suitable for irrigation systems because each exhibits a tensile load at yield of less than 160 N (Tape A has a tensile load at yield of 137.2, and Tape N has a tensile load at yield of 157.6 N). Tape A and Tape B are not suitable for irrigation systems because each exhibits a tensile stress at yield of less than 19 MPa (Tape A has a tensile stress at yield of 17.9 MPa, and Tape B has a tensile stress at yield of 16.6 MPa). Tape C containing CS 4 could not be processed into a microirrigation drip tape due to insufficient melt stretchability that caused the tape to break at the calibration.

Microirrigation drip tapes containing Ex 5, Ex 6, Ex 7, and Ex 8 (i.e., Tapes D-M and O) are suitable for irrigation systems because each can be extruded at surprisingly high speeds with a thin wall thickness of 6 mil (152.4 μm) and 8 mil (203.2 μm). This is unexpected because traditional unimodal HDPE is not suitable for extrusion in thin layers at high speeds.

Microirrigation drip tapes containing Ex 5, Ex 6, Ex 7, and Ex 8 (i.e., Tapes D-M and O) may advantageously be formed with a thin wall thickness of 6 mil (152.4 μm) and 8 mil (203.2 μm) while surprisingly maintaining the pressure performance (i.e., a burst pressure equal to or greater than 0.31 MPa) and tensile performance (i.e., a tensile stress at yield equal to or greater than 19 MPa and/or a tensile load at yield of equal to or greater than 160 N) of the tape. Consequently, the present formulation enables the production of microirrigation drip tapes at high speeds with less material than traditional unimodal HDPE, without compromising the pressure performance and tensile performance of said microirrigation drip tapes.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A formulation comprising a high density polyethylene composition, wherein the high density polyethylene composition comprises:
    (i) a high molecular weight component comprising an ethylene/α-olefin copolymer, the high molecular weight component having a density from 0.924 g/cc to 0.930 g/cc and a high load melt index (I21) from 0.3 g/10 min to 0.9 g/10 min, as measured according to ASTM D1238 (190° C., 21.6 kg); and
    (ii) a low molecular weight component comprising an ethylene-based polymer selected from the group consisting of an ethylene homopolymer and an ethylene/α-olefin copolymer; and
    the high density polyethylene composition has:
    (a) a density from 0.950 g/cc to 0.956 g/cc;
    (b) a high load melt index (I21) from 15 g/10 min to 28 g/10 min;
    (c) an I21/I2 of at least 85, wherein I2 is the melt index as measured according to ASTM D1238 (190° C., 2.16 kg);
    (d) a notched constant tensile load failure time at 35% yield stress, as measured according to ASTM D5397, of greater than 90 hours; and
    (e) an environmental stress crack resistance (ESCR) F0 value, according to ASTM D1693—condition B (100% IGEPAL), of greater than 2,000 hours.

2. The formulation of claim 1, wherein the high density polyethylene composition has a molecular weight distribution (Mw/Mn) from 15 to 23.

3. The formulation of claim 1 comprising from 45 wt % to 60 wt % of the high molecular weight component, based on the total weight of the high density polyethylene composition.

4. The formulation of claim 1, wherein the high density polyethylene composition has
    (f) a shear thinning index (SHI) (2.7/210) from 30 to 50, as measured at 190° C.

5. The formulation of claim 1, wherein the high density polyethylene corn position has
    (g) a die swell ratio of less than 1.25.

6. The formulation of claim 1, wherein the high density polyethylene corn position has
    (h) a tensile stress at yield from 20 MPa to 30 MPa, as measured according to ASTM D638 (2 inch/min crosshead speed).

7. The formulation of claim 1 further comprising carbon black.

8. The formulation of claim 7 comprising from 0.5 wt % to 5 wt % of the carbon black.

9. The formulation of claim 1 comprising at least 90 wt % of the high density polyethylene composition.

10. A microirrigation drip tape comprising the formulation of claim 1.

\* \* \* \* \*